Feb. 18, 1941.  E. S. JONES  2,231,917
WELDING ELECTRODE
Filed March 11, 1940
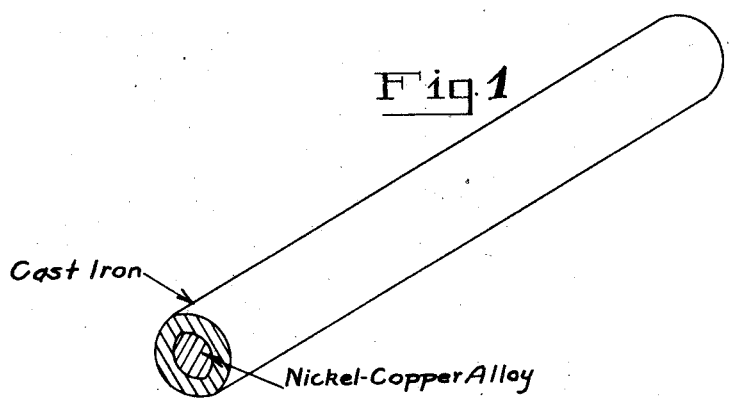
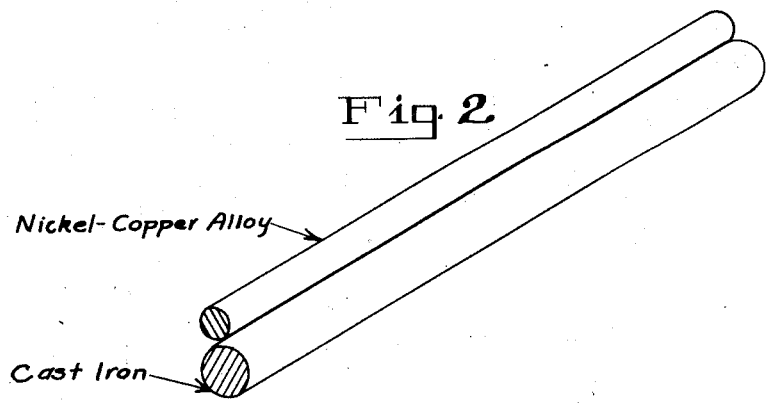
INVENTOR
EDWARD S. JONES
BY
ATTORNEYS Patented Feb. 18, 1941

2,231,917

UNITED STATES PATENT OFFICE 2,231,917

WELDING ELECTRODE

Edward S. Jones, Birmingham, Ala.

Application March 11, 1940, Serial No. 323,391

7 Claims. (Cl. 219—8)

My invention relates to an improved composition for welding electrodes, and more particularly to a composition for an electrode adapted to weld cast iron by the electric-arc welding process.

Heretofore, it has been considered commercially impractical to weld cast iron by the electric-arc process. (See "Oxy-Acetylene Welding and Cutting-Electric and Thermit Welding" (1938) by Harold P. Manly, page 150.)

Where cast iron has heretofore been joined together by an electric welding process, the only electrode usable for such purpose with which I am familiar has comprised a nickel-copper alloy which, with its relatively low strength is unsuitable for welding parts together where strength is a requisite.

Where the autogenous welding of cast iron has heretofore been practiced, oxy-acetylene, or other gas welding has been employed. In such welding the practice has been to employ a cast iron welding rod. Attempts to employ a cast iron welding electrode in an electric welding process, however, have not met with success, so far as I am aware.

I have discovered that, by the use of an electrode of the composition hereinafter described, the electric-arc welding of cast iron becomes as easy as gas welding of cast iron, and the welds so produced are equal to, if not superior in every respect to those made by the gas process.

One object of my invention, therefore, is the provision of a welding electrode for welding cast iron which produces a weld free of hard spots, blow holes, and expansion cracks, and which is capable of being machined to the same extent and with the same tools as is the original cast iron.

Another object is to provide a welding electrode for cast iron which has low internal resistance and which at the same time will form a weld in cast iron which has greater strength than the original cast iron adjacent the weld.

Another object of my invention is the provision of a welding electrode for use in welding cast iron by the electric-arc process which produces a weld capable of withstanding severe shock loads, such as are imposed on certain cast iron parts of machinery, such as gears, fly wheels, and the like.

Another object of my invention is to provide a welding electrode for welding cast iron by the electric-arc process which does not require preheating of the work to be welded, and which will form welds at great speed.

A further object of my invention is to provide a welding electrode having all the foregoing characteristics which will produce a weld in cast iron very similar in structure with the original metal, thus maintaining a practically homogeneous structure throughout the whole body of the casting.

Briefly, my invention comprises an electrode containing a preponderance of gray cast iron, a smaller quantity of nickel and a still smaller quantity of copper. The cast iron used in my electrode, with the exception of sulphur, preferably contains the impurities ordinarily found in commercial cast iron, as I have found that the quality of a weld made by the electric-arc process is improved by the impurities.

My invention is illustrated in the accompanying drawing, wherein—

Fig. 1 is a perspective sectional view showing an electrode formed of a core of nickel-copper alloy with a sheath of cast iron surrounding the core.

Fig. 2 is a perspective sectional view showing an electrode formed by joining a rod of nickel-copper alloy to a rod of cast iron.

To produce a weld having the greatest degree of machinability, I may employ an electrode of approximately the following proportions by weight:

Example 1

| | Per cent |
|---|---|
| Cast iron | 60 |
| Nickel | 28 |
| Copper | 12 |

While it is possible to make fairly good welds in cast iron with a composition containing between 20% and 36% nickel, 8% to 16% copper, and the remainder principally cast iron, the proportions set forth in Example 1 have been found to be the best for machinable welds.

Cast iron used in my improved composition normally contains substantially the following:

| | Per cent |
|---|---|
| Carbon | 3.0 to 4.0 |
| Sulphur | .5 to 1.0 |
| Manganese | .5 to 1.0 |
| Silicon | 1.0 to 1.5 |
| Iron | 93.0 to 95.0 |

My improved electrode is preferably made by mechanically joining the cast iron to an alloy of nickel and copper. The nickel-copper alloy may be such as described in United States Patent No. 1,389,476, to Churchward, issued August 30, 1921. The proportion of nickel in the alloy may vary from 44% to 70%, and that of copper from 29% to 54%. For example, I may make a core of the nickel-copper alloy, and then form a sheath by pouring molten cast iron around the core as shown in Fig. 1. Also, the electrode may be made by simply lashing, side by side, a cast iron rod of substantially the foregoing composition and a nickel-copper alloy, as shown in Fig. 2, the percentages of the total being maintained by selecting rods of proper size.

In using an electrode having the above composition, I prefer to weld with straight polarity and regulate the welding machine so that it operates at low temperature. I may employ any of the well known coatings or fluxes on my improved electrode. For example, one well known coating comprises principally a composition of carbon and manganese with a binding agent. Since the function of coatings in electric-arc welding is well understood by those skilled in this art, no further description of the quantities or qualities of the fluxes is here needed. Suffice it to say that coatings used with my improved electrode perform the same function as they now do with other types of welding electrodes for electric-arc welding.

I have found that a weld formed by a composition such as herein described is strong, shock resisting, and machinable, and meets every requirement demanded of commercially welded cast iron. The addition of copper serves, among other things, to reduce the internal resistance of the electrode so that the maximum heat is developed at the fusion point adjacent the weld. Furthermore, the fact that less oxidation of the molten puddle takes place at the point of fusion when welding by the electric-arc process, as distinguished from gas welding, applies with equal emphasis to welding cast iron, and I have found that oxidation does not take place to any appreciable extent when using my improved electrode.

In many instances it is desirable to weld cast iron parts which require no machining, the only requirement being that the weld possess the same qualities as the original metal as to strength, structure and expansion. Such instances are hot water backs, rough machine parts, and the like. To produce such a weld I may use a composition containing approximately the following proportions by weight:

*Example 2*

| | Per cent |
|---|---|
| Cast iron | 74 |
| Nickel | 14 |
| Copper | 12 |

While it is possible to make good welds of limited machinability with a composition containing between 10% and 18% nickel, 10% to 14% copper, and the remainder cast iron, I have found that for general purposes when machinability is not necessary, the composition in Example 2 is generally preferable.

The advantage in the composition in Example 2 is that it can be produced at somewhat less expense than the one containing more nickel and copper, and for certain types of welds is just as good as the more expensive composition.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A welding electrode containing between 10% and 36% nickel, 8% to 16% copper, and the remainder principally gray cast iron.

2. A welding electrode containing nickel approximately 28%, copper approximately 12%, and the remainder principally gray cast iron.

3. A welding electrode containing between 20% and 36% nickel, 8% to 16% copper, 3% to 4% carbon, .5% to 1% manganese, 1% to 1.5% silicon, and the remainder principally iron.

4. A welding electrode containing between 10% and 18% nickel, 10% to 14% copper, and the remainder principally gray cast iron.

5. A welding electrode containing nickel approximately 14%, copper approximately 12%, and the remainder principally gray cast iron.

6. A welding electrode comprising a core and a sheath of gray cast iron, said core comprising an alloy containing nickel between 10% and 18% of the total weight of the electrode, and copper between 10% and 14% of the total weight of the electrode.

7. A welding electrode comprising a core and a sheath of gray cast iron, said core containing nickel approximately 14% of the total weight of the electrode, and copper approximately 12% of the total weight of the electrode.

EDWARD S. JONES.